United States Patent [19]
Blok et al.

[11] Patent Number: 6,084,022
[45] Date of Patent: Jul. 4, 2000

[54] TIRE TREAD COMPOSITIONS CONTAINING ASYMMETRICALLY TIN-COUPLED POLYBUTADIENE RUBBER

[75] Inventors: Edward John Blok, Wadsworth; Paul Harry Sandstrom, Tallmadge; Cheryl Ann Losey, Kent; Adel Farhan Halasa, Bath; Wen-Liang Hsu, Cuyahoga Falls; David John Zanzig, Uniontown; John Joseph Andre Verthe, Kent, all of Ohio

[73] Assignee: The Goodyear Tire & Rubber Company, Akron, Ohio

[21] Appl. No.: 08/935,172

[22] Filed: Sep. 22, 1997

[51] Int. Cl.[7] .............................. C08L 7/00; C08L 9/00; C08K 3/36
[52] U.S. Cl. ........................ 524/526; 525/236; 525/237
[58] Field of Search .................... 525/236, 237; 524/526

[56] References Cited

U.S. PATENT DOCUMENTS

| | | | |
|---|---|---|---|
| 4,482,678 | 11/1984 | Furukawa et al. | 525/237 |
| 4,647,614 | 3/1987 | Takao et al. | 525/236 |
| 5,512,626 | 4/1996 | Matsuo et al. | 525/236 |

FOREIGN PATENT DOCUMENTS

| | | | |
|---|---|---|---|
| 0647675 | 4/1995 | European Pat. Off. | C08L 7/00 |
| 2430960 | 2/1980 | France | C08L 9/06 |

*Primary Examiner*—Donald R. Wilson
*Attorney, Agent, or Firm*—Alvin T Rockhill

[57] ABSTRACT

This invention relates to a tire tread compound that is easily processable which can be used to improve the treadwear, rolling resistance and traction characteristics of tires. The tire tread compounds of this invention are a blend of tin-coupled polybutadiene, high vinyl polybutadiene and natural rubber. This blend of low glass transition temperature rubber and high glass transition temperature rubber is surprisingly easy to process which makes the concept of this invention commercially feasible. Thus, the tire tread compounds of this invention can be utilized in making tires having greatly improved traction characteristics and treadwear without sacrificing rolling resistance. These improved properties may be due, in part, to better interaction and compatibility with carbon black and/or silica fillers. The polybutadiene in the blend can be asymmetrical tin-coupled to further improve the cold flow characteristics of the rubber blend. Asymmetrical tin coupling in general also leads to better processability and other beneficial properties. This invention more specifically discloses a tire tread rubber composition which is comprised of (1) from about 20 phr to about 60 phr of tin-coupled polybutadiene rubber, (2) from about 20 phr to about 60 phr of a rubber selected from the group consisting of natural rubber and synthetic polyisoprene and (3) from about 5 phr to about 40 phr of high vinyl polybutadiene rubber.

17 Claims, No Drawings

TIRE TREAD COMPOSITIONS CONTAINING ASYMMETRICALLY TIN-COUPLED POLYBUTADIENE RUBBER

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. Good tread wear is also an important consideration because it is generally the most important factor which determines the life of the tire.

The traction, tread wear and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubber material for automobile tire treads. However, such blends are not totally satisfactory for all purposes.

Rubbers having intermediate glass transition temperatures (−70° C. to −40° C.) compromise rolling resistance and treadwear without significantly increasing traction characteristics. For this reason, blends of rubbers having low glass transition temperatures and rubbers having high glass transition temperatures are frequently utilized to attain improved traction characteristics without significantly compromising rolling resistance or treadwear. However, such blends of rubbers having low glass transition temperatures and rubbers having high glass transition temperatures exhibit poor processability. This major disadvantage associated with such blends has greatly hampered their utilization in making tire tread compounds.

Tin-coupled polymers are known to provide desirable properties, such as improved treadwear and reduced rolling resistance, when used in tire tread rubbers. Such tin-coupled rubbery polymers are typically made by coupling the rubbery polymer with a tin coupling agent at or near the end of the polymerization used in synthesizing the rubbery polymer. In the coupling process, live polymer chain ends react with the tin coupling agent thereby coupling the polymer. For instance, up to four live chain ends can react with tin tetrahalides, such as tin tetrachloride, thereby coupling the polymer chains together.

SUMMARY OF THE INVENTION

This invention relates to a tire tread compound that is easily processable which can be used to improve the treadwear, rolling resistance and traction characteristics of tires. The tire tread compounds of this invention are a blend of tin-coupled polybutadiene, high vinyl polybutadiene and natural rubber. This blend of low glass transition temperature rubber and high glass transition temperature rubber is surprisingly easy to process which makes the concept of this invention commercially feasible. Thus, the tire tread compounds of this invention can be utilized in making tires having greatly improved traction characteristics and tread- wear without sacrificing rolling resistance. These improved properties may be due, in part, to better interaction and compatibility with carbon black and/or silica fillers. The polybutadiene in the blend can be asymmetrically tin-coupled to further improve the cold flow characteristics of the rubber blend. Asymmetrical tin coupling in general also leads to better processability and other beneficial properties.

This invention more specifically discloses a tire tread rubber composition which is comprised of (1) from about 20 phr to about 60 phr of tin-coupled polybutadiene rubber, (2) from about 20 phr to about 60 phr of a rubber selected from the group consisting of natural rubber and synthetic polyisoprene and (3) from about 5 phr to about 40 phr of high vinyl polybutadiene rubber.

It is normally preferred for the tin-coupled polybutadiene rubber to be asymmetrically tin-coupled. In such cases, the stability of blends containing asymmetrical tin-coupled polybutadiene rubber can be improved by adding a tertiary chelating amine thereto subsequent to the time at which the tin-coupled rubbery polymer is coupled. N,N,N',N'-tetramethylethylenediamine (TMEDA) is a representative example of a tertiary chelating amine which is preferred for utilization in stabilizing the polymer blends of this invention.

DETAILED DESCRIPTION OF THE INVENTION

The tire tread rubber compositions of this invention are comprised of (1) from about 20 phr to about 60 phr of tin-coupled polybutadiene rubber, (2) from about 20 phr to about 60 phr of a rubber selected from the group consisting of natural rubber and synthetic polyisoprene and (3) from about 5 phr to about 40 phr of high vinyl polybutadiene rubber. These tire tread rubbers will typically contain from about 25 phr to about 55 phr of the tin-coupled polybutadiene rubber, from about 25 phr to about 55 phr of the rubber selected from the group consisting of natural rubber and synthetic polyisoprene and from about 10 phr to about 30 phr of the high vinyl polybutadiene rubber. It is normally preferred for the tire tread rubber to contain from about 30 phr to about 50 phr of the tin-coupled polybutadiene rubber, from about 30 phr to about 50 phr of the rubber selected from the group consisting of natural rubber and synthetic polyisoprene and from about 15 phr to about 25 phr of the high vinyl polybutadiene rubber.

The high vinyl polybutadiene rubber employed in the blends of this invention will normally have a glass transition temperature which is within the range of about −40° C. to +40° C. and a Mooney ML 1+4 viscosity which is within the range of about 30 to about 100. The high vinyl polybutadiene rubber employed in the blends of this invention will preferably have a glass transition temperature which is within the range of about −35° C. to 0° C. and a Mooney ML 1+4 viscosity which is within the range of about 40 to about 90. The high vinyl polybutadiene rubber employed in the blends of this invention will preferably have a glass transition temperature which is within the range of about −30° C. to −20° C. and a Mooney ML 1+4 viscosity which is within the range of about 60 to about 80.

The tin-coupled polybutadiene will typically have a Mooney ML 1+4 viscosity which is within the range of about 5 to about 40 before coupling and a Mooney ML 1+4 viscosity of about 60 to about 120 after coupling. The tin-coupled polybutadiene will preferably have a Mooney ML 1+4 viscosity which is within the range of about 5 to about 35 before coupling and a Mooney ML 1+4 viscosity of about 75 to about 110 after coupling. The tin-coupled polybutadiene will most preferably have a Mooney ML 1+4 viscosity which is within the range of about 10 to about 30 before coupling and a Mooney ML 1+4 viscosity of about 80 to about 100 after coupling.

The tin-coupled polybutadiene will typically be prepared by reacting "living" polybutadiene having lithium end groups with a tin halide, such as tin tetrachloride. This coupling step will normally be carried out as a batch process. However, it is generally preferred to tin-couple the polybutadiene in a continuous process which results in the formation of asymmetrically tin-coupled polybutadiene rubber. A technique for producing asymmetrically tin-coupled polybutadiene rubber is disclosed in U.S. Provisional Patent Application Ser. No. 60/037,929, filed on Feb. 14, 1997. The teachings of U.S. Provisional Patent Application Ser. No. 60/037,929 are hereby incorporated herein by reference in their entirety.

The tin coupling agent employed in making asymmetrically tin-coupled polybutadiene rubber will normally be a tin tetrahalide, such as tin tetrachloride, tin tetrabromide, tin tetrafluoride or tin tetraiodide. However, tin trihalides can also optionally be used. In cases where tin trihalides are utilized, a coupled polymer having a maximum of three arms results. To induce a higher level of branching, tin tetrahalides are normally preferred. As a general rule, tin tetrachloride is most preferred.

Broadly, and exemplary, a range of about 0.01 to 4.5 milliequivalents of tin coupling agent is employed per 100 grams of the rubbery polymer. It is normally preferred to utilize about 0.01 to about 1.5 milliequivalents of the tin coupling agent per 100 grams of polymer to obtain the desired Mooney viscosity. The larger quantities tend to result in production of polymers containing terminally reactive groups or insufficient coupling. One equivalent of tin coupling agent per equivalent of lithium is considered an optimum amount for maximum branching. For instance, if a tin tetrahalide is used as the coupling agent, one mole of the tin tetrahalide would be utilized per four moles of live lithium ends. In cases where a tin trihalide is used as the coupling agent, one mole of the tin trihalide will optimally be utilized for every three moles of live lithium ends. The tin coupling agent can be added in a hydrocarbon solution, e.g., in cyclohexane, to the polymerization admixture in the reactor with suitable mixing for distribution and reaction.

After the tin coupling has been completed, a tertiary chelating alkyl 1,2-ethylene diamine can optionally be added to the polymer cement to stabilize the tin-coupled rubbery polymer. This technique for stabilization of the tin-coupled rubber is more fully described in U.S. Pat. No. 5,739,182, filed on Jan. 31, 1997. The teachings of U.S. Pat. No. 5,739,182 are incorporated herein by reference in their entirety. The tertiary chelating amines which can be used for stabilization are normally chelating alkyl diamines of the structural formula:

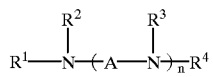

wherein n represents an integer from 1 to about 6, wherein A represents an alkane group containing from 1 to about 6 carbon atoms and wherein $R^1$, $R^2$, $R^3$ and $R^4$ can be the same or different and represent alkane groups containing from 1 to about 6 carbon atoms. The alkane group A is the formula $-(CH_2)_m$ wherein m is an integer from 1 to about 6. The alkane group will typically contain from 1 to 4 carbon atoms (m will be 1 to 4) and will preferably contain 2 carbon atoms. In most cases, n will be an integer from 1 to about 3 with it being preferred for n to be 1. It is preferred for $R^1$, $R^2$, $R^3$ and $R^4$ to represent alkane groups which contain from 1 to 3 carbon atoms. In most cases, $R^1$, $R^2$, $R^3$ and $R^4$ will represent methyl groups.

A sufficient amount of the chelating amine should be added to complex with any residual tin coupling agent remaining after completion of the coupling reaction. In most cases, from about 0.01 phr (parts by weight per 100 parts by weight of dry rubber) to about 2 phr of the chelating alkyl 1,2-ethylene diamine will be added to the polymer cement to stabilize the rubbery polymer. Typically, from about 0.05 phr to about 1 phr of the chelating alkyl 1,2-ethylene diamine will be added. More typically, from about 0.1 phr to about 0.6 phr of the chelating alkyl 1,2-ethylene diamine will be added to the polymer cement to stabilize the rubbery polymer.

After the polymerization, asymmetrical tin coupling and optionally the stabilization step, has been completed, the tin-coupled rubbery polymer can be recovered from the organic solvent utilized in the solution polymerization. The tin-coupled rubbery polymer can be recovered from the organic solvent and residue by means such as decantation, filtration, centrification and the like. It is often desirable to precipitate the tin-coupled rubbery polymer from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the tin-coupled rubbery polymer from the polymer cement also "kills" any remaining living polymer by inactivating lithium end groups. After the tin-coupled rubbery polymer is recovered from the solution, steam-stripping can be employed to reduce the level of volatile organic compounds in the tin-coupled rubbery polymer.

The asymmetrical tin-coupled polybutadiene rubber that can be employed in the blends of this invention are comprised of a tin atom having at least three polybutadiene arms covalently bonded thereto. At least one of the polybutadiene arms bonded to the tin atom has a number average molecular weight of less than about 40,000 and at least one of the polybutadiene arms bonded to the tin atom has a number average molecular weight of at least about 80,000. The ratio of the weight average molecular weight to the number average molecular weight of the asymmetrical tin-coupled polybutadiene rubber will also normally be within the range of about 2 to about 2.5.

The asymmetrical tin-coupled polybutadiene rubber that can be utilized in the blends of this invention is typically of the structural formula:

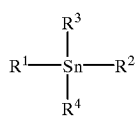

wherein $R^1$, $R^2$, $R^3$ and $R^4$ can be the same or different and are selected from the group consisting of alkyl groups and polybutadiene arms (polybutadiene rubber chains), with the proviso that at least three members selected from the group consisting of $R^1$, $R^2$, $R^3$ and $R^4$ are polybutadiene arms, with the proviso that at least one member selected from the group consisting of $R^1$, $R^2$, $R^3$ and $R^4$ is a low molecular weight polybutadiene arm having a number average molecular weight of less than about 40,000, with the proviso that at least one member selected from the group consisting of $R^1$, $R^2$, $R^3$ and $R^4$ is a high molecular weight polybutadiene arm having a number average molecular weight of greater than about 80,000, and with the proviso that the ratio of the weight average molecular weight to the number average molecular weight of the asymmetrical tin-coupled polybutadiene rubber is within the range of about 2 to about 2.5. It should be noted that $R^1$, $R^2$, $R^3$ and $R^4$ can be alkyl groups because it is possible for the tin halide coupling agent to react directly with alkyl lithium compounds which are used as the polymerization initiator.

In most cases, four polybutadiene arms will be covalently bonded to the tin atom in the asymmetrical tin-coupled polybutadiene rubber. In such cases, $R^1$, $R^2$, $R^3$ and $R^4$ will all be polybutadiene arms. The asymmetrical tin-coupled polybutadiene rubber will often contain a polybutadiene arm of intermediate molecular weight as well as the low molecular weight arm and the high molecular weight arm. Such intermediate molecular weight arms will have a molecular weight which is within the range of about 45,000 to about 75,000. It is normally preferred for the low molecular polybutadiene arm to have a molecular weight of less than about 30,000, with it being most preferred for the low molecular weight arm to have a molecular weight of less than about 25,000. It is normally preferred for the high molecular polybutadiene arm to have a molecular weight of greater than about 90,000, with it being most preferred for the high molecular weight arm to have a molecular weight of greater than about 100,000.

The tire tread rubber compositions of this invention can be compounded utilizing conventional ingredients and standard techniques. For instance, these tire tread rubber blends will typically be mixed with carbon black and/or silica, sulfur, fillers, accelerators, oils, waxes, scorch inhibiting agents and processing aids. In most cases, the rubber blend will be compounded with sulfur and/or a sulfur-containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur-containing compound with 1 phr to 2.5 phr being preferred. It may be desirable to utilize insoluble sulfur in cases where bloom is a problem.

At least some silica will be utilized in the blend as a filler. The filler can, of course, be comprised totally of silica. However, in some cases, it will be beneficial to utilize a combination of silica and carbon black as the filler. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The polybutadiene blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers and 0 to 1 phr of scorch inhibiting agents.

To fully realize the total advantages of the blends of this invention, silica will normally be included in the tread rubber formulation. The processing of the rubber blend is normally conducted in the presence of a sulfur containing organosilicon compound to realize maximum benefits. Examples of suitable sulfur-containing organosilicon compounds are of the formula:

$$Z\text{-Alk-}S_n\text{-Alk-}Z \qquad (1)$$

in which Z is selected from the group consisting of

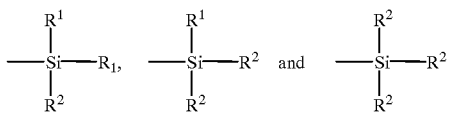

where $R^1$ is an alkyl group of 1 to 4 carbon atoms, cyclohexyl or phenyl; wherein $R^2$ is alkoxy of 1 to 8 carbon atoms or cycloalkoxy of 5 to 8 carbon atoms; and wherein Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl)tetrasulfide, 3,3'-bis(triethoxysilylpropyl)octasulfide, 3,3,'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl) tetrasulfide, bis(trimethoxysilylmethyl)tetrasulfide, 3-methoxy ethoxy propoxysilyl 3'-diethoxybutoxysilylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3,'-bis(propyl diethoxysilylpropyl)disulfide, 3,3'-bis(butyl dimethoxysilylpropyl)trisulfide, 3,3,'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis (trimethoxysilylcyclohexylene)tetrasulfide, 5,5,'-bis (dimethoxymethylsilylpentyl)trisulfide, 3,3'-bis (trimethoxysilyl-2-methylpropyl)tetrasulfide, 3,3'-bis (dimethoxyphenylsilyl-2-methylpropyl)disulfide.

The preferred sulfur-containing organosilicon compounds are the 3,3'-bis(trimethoxy or triethoxy silylpropyl) sulfides. The most preferred compound is 3,3'-bis (triethoxysilylpropyl) tetrasulfide. Therefore, as to Formula I, preferably Z is

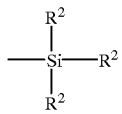

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur-containing organosilicon compound of Formula I in a rubber composition will vary, depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of formula I will range from about 0.05 to about 0.25 parts by weight per part by weight of the silica.

In addition to the sulfur-containing organosilicon, the rubber composition should contain a sufficient amount of silica, and carbon black, if used, to contribute a reasonably high modulus and high resistance to tear. The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example, the ingredients are typically mixed in at least two stages, namely at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur-containing organosilicon, and carbon black, if used, are mixed in one or more non-productive mix stages. The terms "non-productive" and "productive" mix stages are well known to those having skill in the rubber mixing art. The sulfur-vulcanizable rubber composition containing the sulfur-containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The tire tread compounds of this invention can be used in tire treads in conjunction with ordinary tire manufacturing techniques. Tires are built utilizing standard procedures with the polybutadiene rubber blend simply being substituted for the rubber compounds typically used as the tread rubber. After the tire has been built with the polybutadiene rubber-containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to about 18 minutes being most preferred.

By utilizing the rubber blends of this invention in tire tread compounds, traction characteristics can be improved without compromising tread wear or rolling resistance. Since the polybutadiene rubber blends of this invention do not contain styrene, the cost of raw materials can also be reduced. This is because styrene and other vinyl aromatic monomers are expensive relative to the cost of 1,3-butadiene.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment, a tin-coupled polybutadiene rubber was prepared in a 10-gallon (38 liter) batch reactor at a temperature of 70° C. In the procedure used, 22,400 grams of a silica/molecular sieve/aluminum dried premix containing 17.5 weight percent of 1,3-butadiene in hexanes was charged into the 10-gallon reactor. After the amount of impurity in the premix was determined, 28.8 ml of 1.6 M solution of n-butyl lithium (in hexane) was added to the reactor. The target Mn (number averaged molecular weight) was 100,000. The polymerization was allowed to proceed at 70° C. for two hours. An analysis of the residual monomer indicated that all monomers were totally consumed. After a small aliquot of polymer cement was removed from the reactor (for analysis), 9.2 ml of a 0.65 M solution of tin tetrachloride (in hexane) was added to the reactor and the coupling reaction was carried out at the same temperature for 30 minutes. At this time, 1.5 phr (parts per 100 parts by weight of rubber) of antioxidant was added to the reactor to shortstop the polymerization and to stabilize the polymer.

After the hexane solvent was evaporated, the resulting tin-coupled polybutadiene was dried in a vacuum oven at 50° C. The tin-coupled polybutadiene was determined to have a glass transition temperature (Tg) at −95° C. It was also determined to have a microstructure which contained 8 percent 1,2-polybutadiene units and 92 percent 1,4-polybutadiene units. The Mooney viscosity (ML 1+4@ 100° C.) of the tin-coupled polybutadiene made was determined to be 110. The Mooney Viscosity of the base polybutadiene rubber was also determined to be 11.

EXAMPLE 2

In this experiment, asymmetrically tin-coupled polybutadiene was synthesized in a three-reactor (2 gallons each) continuous system at 90° C. A premix containing 15 percent 1,3-butadiene in hexane was charged into the first reactor continuously at a rate of 117 grams/minute. Polymerization was initiated by adding a 0.128 M solution of n-butyl lithium into the first reactor at a rate of 0.82 grams/minute. Most of monomers were exhausted at the end of second reactor and the polymerization medium containing live lithium ends was continuously pushed into the third reactor where the coupling agent, tin tetrachloride (0.025 M solution in hexane), was added at a rate of 1.16 grams/minutes. The residence time for all three reactors was set at 1.5 hours to achieve complete monomer conversion in the second reactor and complete coupling in the third reactor. The polymerization medium was then continuously pushed over to a holding tank containing a shortstop and an antioxidant. The resulting polymer cement was then steam-stripped and the asymmetrical tin-coupled polybutadiene recovered was dried in an oven at 60° C. The polymer was determined to have a glass transition temperature at −95° C. and have a Mooney ML 1+4@ 100° C. viscosity of 94. It was also determined to have a microstructure which contained 8 percent 1,2-polybutadiene units and 92 percent 1,4-polybutadiene units. The precursor of this polymer (i.e., base polymer prior to coupling) was also determined to have an ML 1+4@ 100° C. of 20.

EXAMPLES 3–4 AND COMPARATIVE EXAMPLES 5–8

In this series of experiments, various rubber blends were prepared and evaluated as tire tread rubber compositions. These blends were prepared by a three-step mixing process. In the first step, non-productive blends were made by mixing the rubbers shown in Table I with 7.0 parts of processing aids, 3 parts of zinc oxide, 2 parts of stearic acid and 0.15 parts of 2,2'-dibenzamidodiphenyl disulfide. This first non-productive mixing step was carried out over a period of about 4 minutes which resulted in a temperature of about 160° C. being attained.

In the procedure used, 12 parts of fine particle-size hydrated silica, 2.25 parts of a 50 percent/50 percent blend of silica and carbon black (X50S from DeGussa GmbH) and 3 parts of a naphthenic/paraffinic process oil were added to the blend in a second non-productive mixing step. This second non-productive mixing step was carried out over a period of about 3 minutes to a temperature of about 150° C.

A productive compound was then made by mixing 0.66 parts of diaryl-p-phenylenediamine, 1.12 parts of N-tert-butyl-2-benzothiazole, 0.14 parts of tetramethylthiuram disulfide and 1.5 parts of rubber makers sulfur into the blend. This productive mixing step was carried out over a period of about 2.5 minutes to a drop temperature of about 120° C. Then, the tire tread rubber compounds were cured and evaluated. The results of this evaluation are shown in Table I.

TABLE I

| Example | 3 | 4 | 5 |
|---|---|---|---|
| Natural Rubber[1] | 40 | 49 | 40 |
| Isoprene-Butadiene Rubber[2] |  | 45 |  |
| 3,4-Polyisoprene[3] |  | 6 |  |
| High Vinyl Polybutadiene[4] | 20 |  | 20 |
| Polybutadiene Rubber[5] | 40 |  |  |
| Tin-Coupled Polybutadiene[6] |  |  | 40 |
| Carbon Black[7] | 38 |  | 38 |
| Silica[8] | 12 |  | 12 |
| Rheometer 150° C. |  |  |  |
| Min torque | 11 | 11 | 9.6 |
| Max torque | 40.8 | 41.3 | 42 |
| delta torque | 29.8 | 30.3 | 32.4 |
| T25 | 6 | 6.25 | 6.75 |
| T90 | 9.75 | 9.75 | 10.5 |
| ATS 18@150 |  |  |  |
| 100% Modulus, MPa | 2.39 | 2.35 | 2.31 |
| 300% Modulus, MPa | 11.07 | 11.09 | 11.83 |
| Brk Str, MPa | 16.61 | 19.27 | 16.94 |
| EL-Brk, % | 441 | 489 | 418 |
| Hardness, RT | 61.6 | 61.6 | 60.9 |
| Hardness, 100° C. | 58.8 | 58.4 | 58.2 |
| Rebound RT % | 56.8 | 56.1 | 61 |
| Rebound, 100° C. | 68.9 | 71.4 | 71.9 |
| DIN | 73 | 96 | 72 |
| Tan Delta -40 | 0.53 | 0.43 | 0.51 |

TABLE I-continued

| Example | 3 | 4 | 5 |
|---|---|---|---|
| −30 | 0.32 | 0.26 | 0.30 |
| −20 | 0.22 | 0.18 | 0.20 |
| −10 | 0.15 | 0.14 | 0.13 |
| 0 | 0.13 | 0.13 | 0.12 |

[1]TSR20
[2]30% Isoprene/70% Butadiene, Tg = −82° C., Mooney ML/4 @ 100° C. = 85
[3]65% 3,4-structure, Mooney ML/4 @ 100° C. = 70
[4]80% Vinyl; 82 Mooney, Tg2
[5]Budene 1209 from −28° C.
[6]Polymer of Example 1
[7]ASTM N-299
[8]HiSil 210 from PPG It is well known that Sn-coupled polymers provide improvements in processing over their linear counterparts. You see an example of this when comparing the Rheometer minimum torque values of Example 5 versus Example 3. The compound of Example 5 contains tin-coupled polybutadiene and has the lower minimum torque. The rebound values of the compound containing the tin-coupled polybutadiene (Example 5) are higher than for the control Example 3, suggesting better rolling resistance (RR) for the compound containing the tin-coupled polybutadiene.

Example 4 is an example of current passenger tread technology. This tread contains a blend of three polymers: (1) NR for processing and traction, (2) IBR for processing, treadwear and RR and (3) 3,4 polyisoprene for traction. The compound of this invention (Example 5) also uses a blend of three polymers, including NR, high vinyl polybutadiene for traction and Sn-coupled polybutadiene for processing, RR and treadwear.

The lab data (Table I) clearly shows the superiority of the new polymer system over that of the current polymer system. The new polymer system provides improved treadwear (DIN abrasion resistance improved 25 percent), along with reduced rolling resistance (RT rebound values increased 9 percent). The wet traction (measured by the tan delta values from −40° C. through 0° C.) should be equal between the two compounds, as can be seen from the tan delta values reported in Table I. It should be noted that higher tan delta values in the range of −40° C. to 0° C. are predictive of better wet reaction characteristics in tires.

In summary, the new polymer system (Example 5) improves the tradeoff between RR, treadwear and wet traction versus current technology (Example 4) and the control polymer system (Example 3).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire tread rubber composition which is comprised of (1) from about 20 phr to about 60 phr of an asymmetrically tin-coupled polybutadiene rubber, (2) from about 20 phr to about 60 phr of a rubber selected from the group consisting of natural rubber and synthetic polyisoprene and (3) from about 5 phr to about 40 phr of high vinyl polybutadiene rubber having a vinyl content of at least about 80 percent, wherein the high vinyl polybutadiene rubber is a high vinyl polybutadiene rubber other than said asymmetrically tin-coupled polybutadiene rubber.

2. A tire tread rubber composition as specified in claim 1 wherein said asymmetrically tin-coupled polybutadiene rubber has a Mooney ML 1+4 viscosity at 100° C. which is within the range of about 60 to about 120.

3. A tire tread rubber composition as specified in claim 2 wherein said asymmetrically tin-coupled polybutadiene rubber is tin-coupled in a continuous process.

4. A tire tread rubber composition as specified in claim 1 wherein said high vinyl polybutadiene rubber has a Mooney ML 1+4 viscosity at 100° C. which is within the range of about 30 to about 100.

5. A tire tread rubber composition as specified in claim 2 wherein said member selected from the group consisting of natural rubber and synthetic polyisoprene is natural rubber.

6. A tire tread rubber composition as specified in claim 2 wherein said member selected from the group consisting of natural rubber and synthetic polyisoprene is synthetic polyisoprene rubber.

7. A tire tread rubber composition as specified in claim 4 wherein the tire tread rubber composition contains from about 25 phr to about 55 phr of the asymmetrically tin-coupled polybutadiene rubber, from about 25 phr to about 55 phr of the rubber selected from the group consisting of natural rubber and synthetic polyisoprene and from about 10 phr to about 30 phr of the high vinyl polybutadiene rubber.

8. A tire tread rubber composition as specified in claim 4 wherein the tire tread rubber composition contains from about 30 phr to about 50 phr of the asymmetrically tin-coupled polybutadiene rubber, from about 30 phr to about 50 phr of the rubber selected from the group consisting of natural rubber and synthetic polyisoprene and from about 15 phr to about 25 phr of the high vinyl polybutadiene rubber.

9. A tire tread rubber composition as specified in claim 7 wherein the high vinyl polybutadiene rubber has a Mooney ML 1+4 viscosity at 100° C. which is within the range of about 40 to about 90.

10. A tire tread rubber composition as specified in claim 8 wherein the high vinyl polybutadiene rubber has a Mooney ML 1+4 viscosity at 100° C. which is within the range of about 60 to about 80.

11. A tire tread rubber composition as specified in claim 8 wherein said asymmetrically tin-coupled polybutadiene rubber has a Mooney ML 1+4 viscosity at 100° C. which is within the range of about 75 to about 110.

12. A tire tread rubber composition as specified in claim 8 wherein said asymmetrically tin-coupled polybutadiene rubber has a Mooney ML 1+4 viscosity at 100° C. which is within the range of about 80 to about 100.

13. A tire tread rubber composition as specified in claim 2 wherein said asymmetrically tin-coupled polybutadiene is of the structural formula:

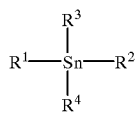

wherein $R^1$, $R^2$, $R^3$ and $R^4$ can be the same or different and are selected from the group consisting of alkyl groups and polybutadiene arms, with the proviso that at least three members selected from the group consisting of $R^1$, $R^2$, $R^3$ and $R^4$ are polybutadiene arms, with the proviso that at least one member selected from the group consisting of $R^1$, $R^2$, $R^3$ and $R^4$ is a low molecular weight polybutadiene arm having a number average molecular weight of less than about 40,000, with the proviso that at least one member selected from the group consisting of $R^1$, $R^2$, $R^3$ and $R^4$ is a high molecular weight polybutadiene arm having a number average molecular weight of greater than about 80,000 and with the proviso that the ratio of the weight average molecular weight to the number average molecular weight of the asymmetrical tin-coupled polybutadiene rubber is within the range of about 2 to about 2.5.

14. A tire tread rubber composition as specified in claim 13 wherein $R^1$, $R^2$, $R^3$ and $R^4$ are all polybutadiene arms.

15. A tire tread rubber composition as specified in claim 13 wherein the low molecular weight polybutadiene arm has a number average molecular weight of less than about 30,000.

16. A tire tread rubber composition as specified in claim 15 wherein the high molecular weight polybutadiene arm has a number average molecular weight of greater than about 90,000.

17. A tire tread rubber composition as specified in claim 1 wherein said composition is further comprised of about 70 phr to about 250 phr of silica and wherein carbon black is present in said composition in an amount which is no greater than about 10 phr.

* * * * *